April 15, 1958     A. J. McMURRY     2,830,406
ADJUSTABLE FLOWER CONTAINER
Filed March 28, 1955
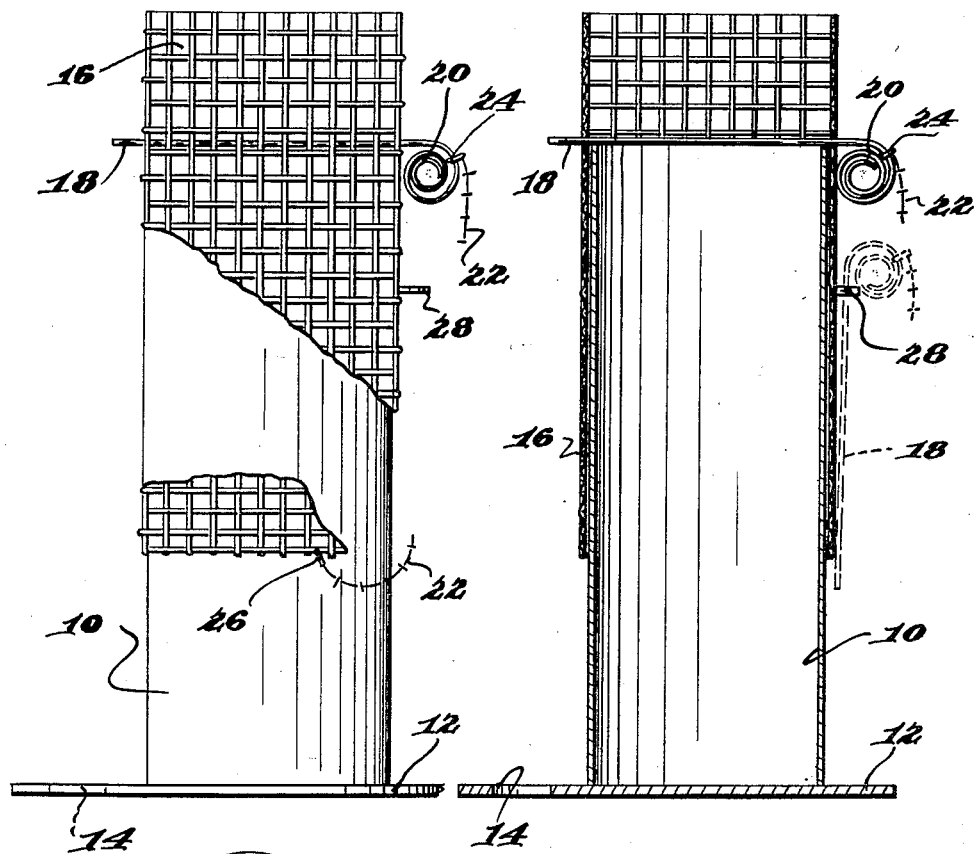
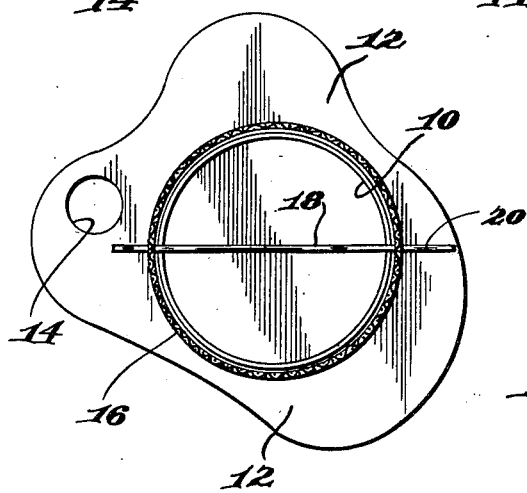
INVENTOR
Alice J. McMurry
BY Robert van Sickler
ATTORNEY United States Patent Office
2,830,406
Patented Apr. 15, 1958

2,830,406
ADJUSTABLE FLOWER CONTAINER
Alice J. McMurry, New York, N. Y.
Application March 28, 1955, Serial No. 497,024
4 Claims. (Cl. 47—41)

This invention relates to vases or flower containers and is particularly designed to accommodate flowers of varying stem lengths.

Conventional vases are made in innumerable heights but no one vase of a constant height is suitable for all types of stemmed flowers or are they sufficiently flexible to accommodate flowers whose freshness is prolonged by cutting or shortening their lengths.

It is an object of my invention to provide a flower container which will adequately support stemmed flowers of a maximum range of lengths.

Another object is to provide a flower container which will enable the stems of flowers to be inserted at various heights around the outer periphery of the container.

A further object is to reduce the number of component parts to a minimum without disturbing the effectiveness of the container.

Still another object is to enable the container to be easily dismantled for cleaning purposes.

An additional object is to provide a container of simple but attractive design.

The invention is exemplified in the combination and arrangement of parts shown in the accompanying drawings and described in the following specifications and it is more particularly pointed out in the appended claims.

In the drawings:

Figure 1 is an elevation of the flower container.

Figure 2 is a vertical section of the container, while

Figure 3 is a top plan view of the same.

In the drawings wherein like reference numerals denote like parts, the numeral 10 refers to a cylindrical open top container, preferably of brass tubing. This container 10 may be welded or secured in any conventional manner to a back 12 and in the particular disclosure is cut or formed to resemble an artist's palette, although it is conceivable that it could be of any desired shape. This artists' palette formation with a thumbhole 14 enables the container and contents to be easily moved or transported.

Positioned on the container 10 is a cylindrical wire mesh cylinder 16 adapted to be moved vertically with respect thereto. In the drawings, this wire mesh cylinder 16 although shown to be of a comparable height to the container 10 could readily be lower or higher. A copper wire plunger 18 having a curled head 20 is shown and here again the particular shape is one of design. A chain 22 is provided and is attached to the plunger 18 at 24 and the other end at a selected location 26 on the lower edge of the mesh cylinder 16.

As readily apparent, the outer wire mesh cylinder 16 may be raised to the desired height above the container 10 and the plunger or shaft 18 inserted into openings in the wire mesh so as to rest on top of the container 10. Obviously, this precludes the outer cylinder from dropping below and also tends to prevent dislodgement of the two cylinders. The length of the chain 22 indicated is of sufficient length to enable the wire mesh cylinder to be raised to a plurality of heights above the metal container 10.

In use, water is put in the container 10 to a desired height and flowers are inserted in the open top. It can be appreciated that normally the height of the vase selected is controlled by the length of the stems of the flowers being displayed. In the absence of a vase of an appropriate height the stems of the flowers have to be cut to allow for a neat arrangement of the flower heads about the top of the container. It can also be appreciated that the use of the wire mesh, when raised above the height of the inner container, permits flowers of relatively small diameter stems, but varying lengths, to be inserted and adequately supported through selected openings in the wire mesh cylinder to permit of additional floral effects.

Due to the simplicity of the construction, the container and wire mesh cylinder may be adjusted with respect to each other even after flowers have been arranged. When the flowers and water are to be discarded, the wire mesh cylinder may be removed by withdrawing the plunger to permit access to the component parts for cleaning purposes. The outer cylinder may be easily withdrawn from its telescoping relationship with the inner container by merely grasping an edge or side of the wire mesh and the container base to effect separation.

An apertured support 28 is also provided which is secured by any conventional means to the side of the wire mesh cylinder 16. When not in use the plunger is inserted vertically into this support 28, as shown in dotted lines in Figure 2. When the outer cylinder is completely telescoped over the metal tubing 10 with the copper plunger resting against this side of the cylinder a very attractive ornament is presented.

Although only one embodiment of the invention has been illustrated and described in detail, it is to be expressly understood that the invention is not limited thereto and various changes may be made in the design, arrangement and combination of parts without departing from the spirit and scope of the invention, as will now likely occur to others skilled in the art. For a definition of the limits of the invention, reference should be had to the appended claims.

What is claimed is:

1. A flower container comprising a base and an open cylindrical container secured thereto, an outer wire mesh cylindrical member mounted in telescoping relation, means for maintaining said outer member in adjusted position, said means comprising a plunger adapted to be inserted horizontally through said wire mesh cylindrical member into opposed vertical or radial openings and to rest atop said open cylindrical container whereby downward movement of said outer member is precluded.

2. In combination with a flower container comprising a water receptacle and an outer wire mesh container, of means for securing said outer container in a selected vertical position, said means comprising supporting means inserted horizontally through said outer wire mesh container into opposed vertical or radial openings and atop said water receptacle whereby said outer container is held above said lower container.

3. In combination with a flower container comprising a water receptacle and an outer wire mesh container, of means for securing said outer container in a selected vertical position, said means comprising supporting means inserted horizontally through said outer wire mesh container into opposed vertical or radial openings and atop said water receptacle whereby said outer container is held above said lower container, and plunger supporting means for maintaining said plunger when in inoperable position secured to said outer wire mesh container.

4. A receptacle for supporting cut flowers at varying heights and different angular positions, a flat base provided with a finger opening, an open cylindrical water receptacle mounted thereon, an outer wire mesh cylindrical member mounted in telescoping relation, means for securing said receptacle and said outer member in opposed vertical positions, and said means comprising a supporting member adapted to be horizontally inserted through opposed vertical or radial openings in said outer wire mesh member and in contact with the top edge of said water receptacle whereby said outer wire mesh member is supported at a selected height above said water receptacle.

References Cited in the file of this patent

UNITED STATES PATENTS

| Number | Name | Date |
|---|---|---|
| 879,753 | Eckert | Feb. 18, 1908 |
| 949,452 | Smith | Feb. 15, 1910 |
| 1,227,105 | Barnes | May 22, 1917 |
| 1,515,078 | Shee | Nov. 11, 1924 |
| 1,762,843 | Straub | June 10, 1930 |
| 1,784,621 | Boyer | Dec. 9, 1930 |
| 2,049,645 | Fleckles | Aug. 4, 1936 |
| 2,062,684 | Thomas | Dec. 1, 1936 |
| 2,381,253 | Bierwert | Aug. 7, 1945 |
| 2,587,237 | Sinaiko | Feb. 26, 1952 |
| 2,774,186 | Wilkins | Dec. 18, 1956 |